(12) United States Patent
Wittwer

(10) Patent No.: US 9,080,535 B2
(45) Date of Patent: Jul. 14, 2015

(54) RECIPROCATING INTERNAL COMBUSTION ENGINE HAVING AT LEAST ONE PISTON

(71) Applicant: Neander Motors AG, Kiel (DE)

(72) Inventor: Ulrich Wittwer, Barsinghausen (DE)

(73) Assignee: Neander Motors AG, Kiel (DE)

( * ) Notice: Subject to any disclaimer, the term of this patent is extended or adjusted under 35 U.S.C. 154(b) by 67 days.

(21) Appl. No.: 13/959,927

(22) Filed: Aug. 6, 2013

(65) Prior Publication Data

US 2014/0041385 A1 Feb. 13, 2014

(30) Foreign Application Priority Data

Aug. 10, 2012 (DE) .......................... 10 2012 015 907

(51) Int. Cl.
*F02B 33/44* (2006.01)
*F01N 3/02* (2006.01)
*B63H 1/14* (2006.01)
(Continued)

(52) U.S. Cl.
CPC .............. *F02M 25/07* (2013.01); *F01N 11/007* (2013.01); *F02B 61/045* (2013.01); *F02B 67/10* (2013.01); *F02B 75/065* (2013.01); *F01N 2550/02* (2013.01); *F02B 37/00* (2013.01); *Y02T 10/47* (2013.01)

(58) Field of Classification Search
CPC ........ F02B 37/00; F02B 61/045; F02B 67/10; F02B 75/065; F02M 25/07
USPC ...... 60/321, 605.1; 440/49, 88 C, 88 D, 88 G, 440/88 J, 89 B
See application file for complete search history.

(56) References Cited

U.S. PATENT DOCUMENTS 5,756,944 A * 5/1998 Battig et al. ................... 181/229
5,857,336 A 1/1999 Paul et al.
(Continued)

FOREIGN PATENT DOCUMENTS

CH 168 912 A 4/1934
DE 30 00 531 A1 7/1981
(Continued)

OTHER PUBLICATIONS

German Office Action dated Apr. 19, 2013 (five (5) pages).
(Continued)

*Primary Examiner* — Audrey K Bradley
(74) *Attorney, Agent, or Firm* — Crowell & Moring LLP

(57) ABSTRACT

A reciprocating internal combustion engine includes a reciprocating piston in a cylinder bore of a cylinder housing forming an assembly together with a cylinder head. Two connecting rods are connected between the piston and first and second crankshafts. The two crankshafts are functionally connected to two synchronization gears of a spur gear box. The synchronization gears are connected to the crankshafts in a torque-proof manner such that the crankshafts rotate synchronously in opposite directions. The engine operates based on the diesel principle and with exhaust gas turbocharging, wherein the engine is an outboard engine for a watercraft. The exhaust gas turbocharger has an exhaust gas turbine and a compressor and/or a shaft which carries a turbine wheel and a compressor wheel which runs perpendicular to the longitudinal dimension of the watercraft. The turbocharger is attached on an upper end-face wall of the assembly.

19 Claims, 6 Drawing Sheets

(51) Int. Cl.

| | |
|---|---|
| *B63H 21/14* | (2006.01) |
| *F01P 3/20* | (2006.01) |
| *F02B 61/04* | (2006.01) |
| *F01M 5/00* | (2006.01) |
| *B63H 20/24* | (2006.01) |
| *F01N 3/04* | (2006.01) |
| *B63H 21/32* | (2006.01) |
| *F02M 25/07* | (2006.01) |
| *F02B 75/06* | (2006.01) |
| *F02B 67/10* | (2006.01) |
| *F01N 11/00* | (2006.01) |
| *F02B 37/00* | (2006.01) |

(56) References Cited

U.S. PATENT DOCUMENTS

| | | | |
|---|---|---|---|
| 6,419,536 B1 | | 7/2002 | Oguma |
| 7,806,110 B1 * | | 10/2010 | Broman et al. ............ 123/559.1 |
| 2003/0017760 A1 * | | 1/2003 | Gokan et al. .................. 440/39 |
| 2006/0201152 A1 * | | 9/2006 | Irisawa ........................ 60/605.1 |
| 2007/0107424 A1 | | 5/2007 | Wizgall et al. |
| 2011/0225955 A1 * | | 9/2011 | Kimura et al. .................. 60/278 |
| 2012/0024254 A1 * | | 2/2012 | Shibazaki ................ 123/184.21 |

FOREIGN PATENT DOCUMENTS

| | | | |
|---|---|---|---|
| DE | 3000531 A * | 7/1981 | ................ F01B 9/02 |
| DE | 33 22 140 A1 | 12/1984 | |
| DE | 19731974 A1 * | 1/1999 | ................ F01L 1/26 |
| DE | 600 15 262 T2 | 10/2005 | |
| DE | 10 2005 056 508 A1 | 5/2007 | |
| DE | 10 2006 033 270 A1 | 1/2008 | |
| DE | 10 2006 060 660 A1 | 6/2008 | |
| GB | 2 450 331 A | 12/2008 | |
| JP | 1-306390 A | 12/1989 | |
| WO | WO 2005/038197 A1 | 4/2005 | |

OTHER PUBLICATIONS

Extended European Search Report dated Dec. 11, 2013 w/ partial English translation (Eight (8) pages).

\* cited by examiner

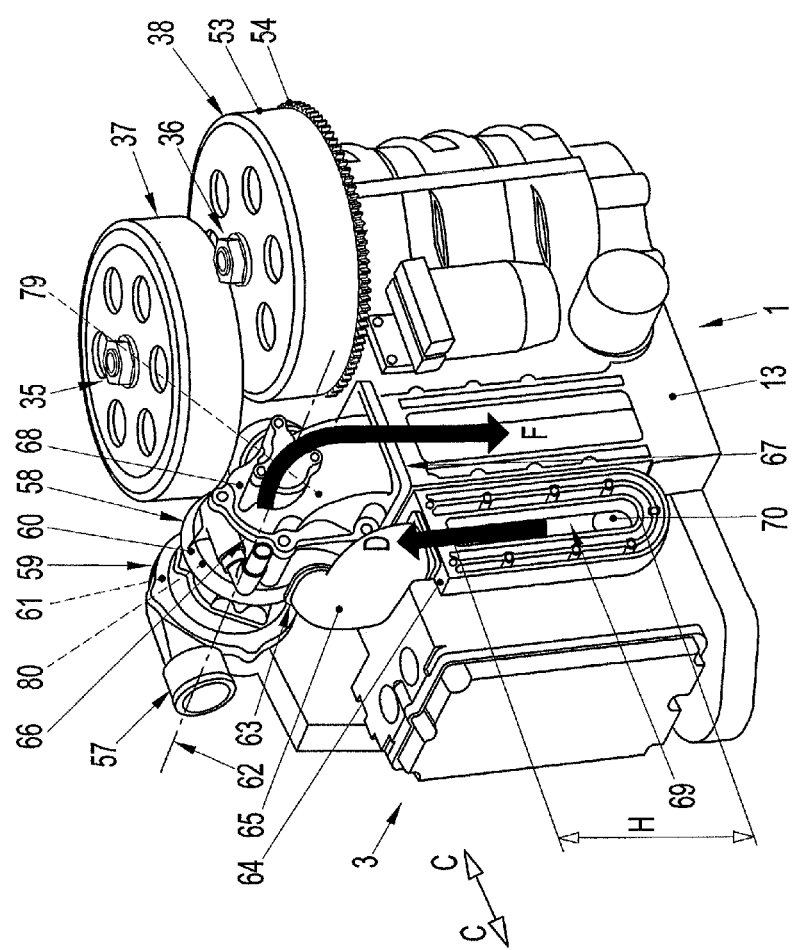

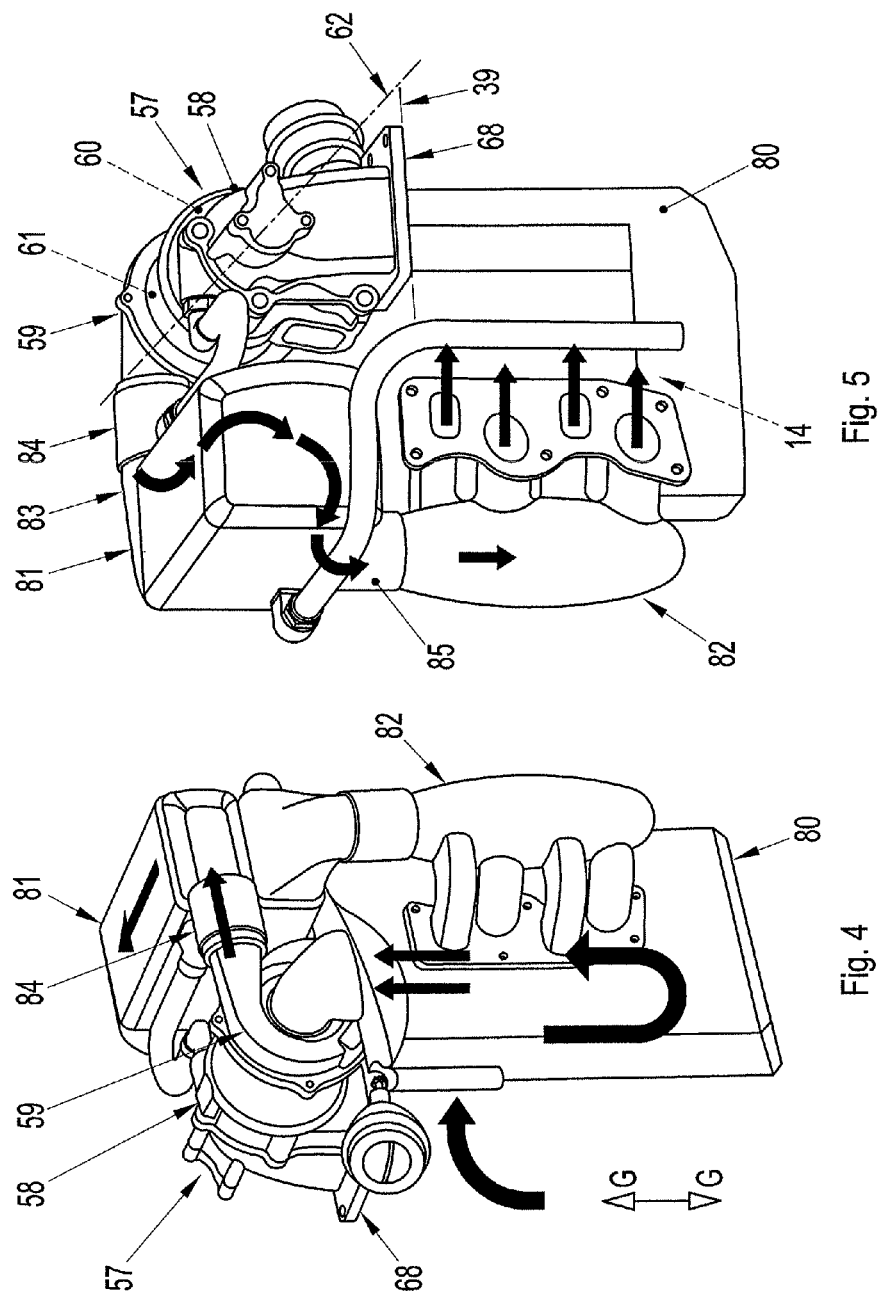

RECIPROCATING INTERNAL COMBUSTION ENGINE HAVING AT LEAST ONE PISTON

CROSS REFERENCE TO RELATED APPLICATIONS

This application claims priority under 35 U.S.C. §119 from German Patent Application No. DE 10 2012 015 907.2, filed Aug. 10, 2012, the entire disclosure of which is expressly incorporated by reference herein.

BACKGROUND AND SUMMARY OF THE INVENTION

The invention relates to a reciprocating internal combustion engine having at least one piston.

A reciprocating internal combustion engine is known from DE 33 22 140 A1, which has a crankcase with a cylinder head and a cylinder housing. The cylinder housing has a cylinder bore in which a piston can move back and forth. Two connecting rods are connected via piston pins to the pistons, and on a side thereof facing opposite the piston pins, work together with two crankshafts arranged in a crankshaft housing. The crankshafts are coupled via two gear wheels which engage with each other, in such a manner that the crankshafts rotate at the same rotation speed, but in the opposite direction. Inlet and outlet valves are configured in the cylinder head and are actuated by way of camshafts lying above the valves, with bucket tappets connected between the valves and the camshafts. This reciprocating internal combustion engine is suitable for use as a gasoline engine for powering passenger vehicles, wherein the crankshaft thereof is oriented to lie horizontal.

A V-engine having at least one turbocharger is known from DE 10 2005 056 508 A1. The V-engine is designed as a diesel engine in the outboard motor class for watercraft. A crankshaft connected to the piston of the engine runs upright, and the turbocharger is arranged on a lower end, facing the water line, of a component assembly including a cylinder head and a cylinder housing. An exhaust system, to which the exhaust gas turbocharger is connected, extends along a space formed by the V-shaped cylinders. A drive shaft for a water propeller has a functional connection to the crankshaft.

The problem addressed by the invention is that of developing a reciprocating internal combustion engine, having at least one piston which works together with two connecting rods and with two crankshafts, wherein the reciprocating internal combustion engine is designed as a highly efficient outboard engine for the purpose of driving a water craft, and works with exhaust gas turbocharging when in a diesel configuration. However, the exhaust gas turbocharger as well as the components and systems of the reciprocating internal combustion engine which have a functional connection to the exhaust gas turbocharger should also be arranged in the reciprocating internal combustion engine with a functionally appropriate and space-saving configuration.

According to the invention, this problem is addressed by providing a reciprocating internal combustion engine having at least one piston which moves back and forth in a cylinder bore of a cylinder housing which forms an assembly together with a cylinder head, and which works together with first and second crankshafts, with two connecting rods connected between the piston and the crankshafts, the same rotating about two crankshaft axes and being functionally connected to two synchronization gears of a spur gear box, said synchronization gears being connected to the crankshafts in a torque-proof manner, in such a manner that the crankshafts rotate synchronously in opposite directions. The reciprocating internal combustion engine is a diesel engine with exhaust gas turbocharging, by way of example, wherein the reciprocating internal combustion engine is preferably designed as an outboard engine for a watercraft. The first and the second crankshafts are oriented upright, with crankshaft axes, in such a manner that one of the two crankshafts acts on a drive screw of the watercraft via a transmission. The exhaust gas turbocharger has an exhaust gas turbocharger device with an exhaust gas turbine and a compressor and/or a shaft which carries a turbine wheel and a compressor wheel, which runs perpendicular to the longitudinal dimension of the watercraft. The exhaust gas turbocharger device is directly or indirectly attached on an upper end-face wall of the assembly comprising the cylinder head and the cylinder housing.

The advantages primarily achieved by the invention are that the internal combustion engine having at least one piston with two connecting rods and two crankshafts has excellent functional characteristics, which are optimized by the fact that they work based on a diesel principle and with exhaust gas turbocharging. With this technical characteristic, the reciprocating internal combustion engine is excellently suited as an outboard engine. The exhaust gas turbocharger and/or the exhaust gas turbocharger device, with its shaft which carries the turbine wheel and the compressor wheel, is ideally arranged perpendicular to the longitudinal direction of the watercraft. In this way, bearing loads on the shaft resulting from tilting movements of the watercraft in its longitudinal dimension are largely non-critical.

It is also exemplary how the exhaust gas turbocharger device is attached on the upper end-face wall of the cylinder head/cylinder housing assembly, i.e. distanced from the water line of the watercraft, thereby preventing water from penetrating the exhaust gas turbocharger device and causing operating malfunctions during natural travel of the watercraft. This is supported by the fact that a first angled tube section is included between the exhaust gas inlet side of the exhaust gas turbine and the first end-face wall segment of the cylinder head, and a second angled tube section is included between the exhaust gas outlet side of the exhaust gas turbine and a second end-face wall of the cylinder housing.

Moreover, it must be emphasized that at least one of the two tube sections forms a rigid connection between the assembly and the exhaust gas turbine. As an example, the cylinder head comprises the first upright exhaust channel on the outlet side thereof, via which exhaust gases are guided upward into the exhaust gas turbine and applied to the turbine wheel there.

It is an excellent solution for the internal combustion engine that the first exhaust channel in the cylinder head is configured with the casing which extends over the substantial height of the cylinder head, said casing being designed as a cooling jacket for the exhaust gases. This cooling jacket has a top-notch technical design because it has an inner cooling channel and an outer cooling channel, wherein the inner cooling channel has motor oil flowing through it, and the outer cooling channel has cooling water flowing through it. The inner cooling channel is connected to the motor lubricating oil circulation, and the outer cooling channel is connected to the cooling water circulation of the reciprocating internal combustion engine.

This well thought-out cooling jacket system ensures that when the outboard engine is operated over a longer period of time on idle—when fishing, for observation uses, or the like—the configuration combats the effects of dropping below a dew point. As such, the configuration substantially prevents the exhaust gas present in the region of the first exhaust gas channel from forming a condensate which combines with exhaust gas fractions—for example acid media—which can damage the metal surfaces of a cylinder region adjacent to the exhaust gas channel over time. A drop below the dew point, as mentioned, is prevented by specifically holding the exhaust gas at a moderate temperature, by means of the circulating medium in the motor lubricating oil circulation when the outboard engine is idling, wherein the cooling water flow is thermostatically interrupted in the region of the cooling mantel and/or the outer cooling channel. The second tube section also sets the standard, the same being at least in sections thereof configured with a cooling channel which is connected to the cooling water circulation of the reciprocating internal combustion engine. Accordingly, a comparable measure is implemented on the exhaust gas turbine of the exhaust gas turbocharger device.

Moreover, the configuration advantageously provides the solution that intake air is supplied to the compressor via the air tank adapted upright to the assembly. The air tank is improved by the fact that an intake air suction muffler is integrated into the same. The fact that the medium leaving the compressor arrives in the intercooler and from there is guided into the suction tank of the intake system, the same connected before the cylinder head, constitutes a constructively practical design. In this case, a first flexible connection piece is included between the compressor and the intercooler, and a second connection piece is included between the intercooler, the same connected to the cooling water circulation, and the suction tank. Finally, the arrangement of the flywheels of the crankshafts, the exhaust gas turbocharger device, and the intercooler on the upper end-face wall of the assembly creates compact structural characteristics.

Other objects, advantages and novel features of the present invention will become apparent from the following detailed description of a preferred embodiment when considered in conjunction with the accompanying drawings.

BRIEF DESCRIPTION OF THE DRAWINGS

FIG. 3 shows a second perspective view of the reciprocating internal combustion engine, with an exhaust gas turbocharger device, cylinder head, cylinder housing, and a first and a second exhaust gas channel, FIG. 4 shows a third perspective view of the reciprocating internal combustion engine, with the air tank, turbocharger device, and intercooler, FIG. 5 shows a fourth perspective view of the reciprocating internal combustion engine, with the turbocharger device, the intercooler, and the suction tank.

DETAILED DESCRIPTION OF THE DRAWINGS

Figure 1:
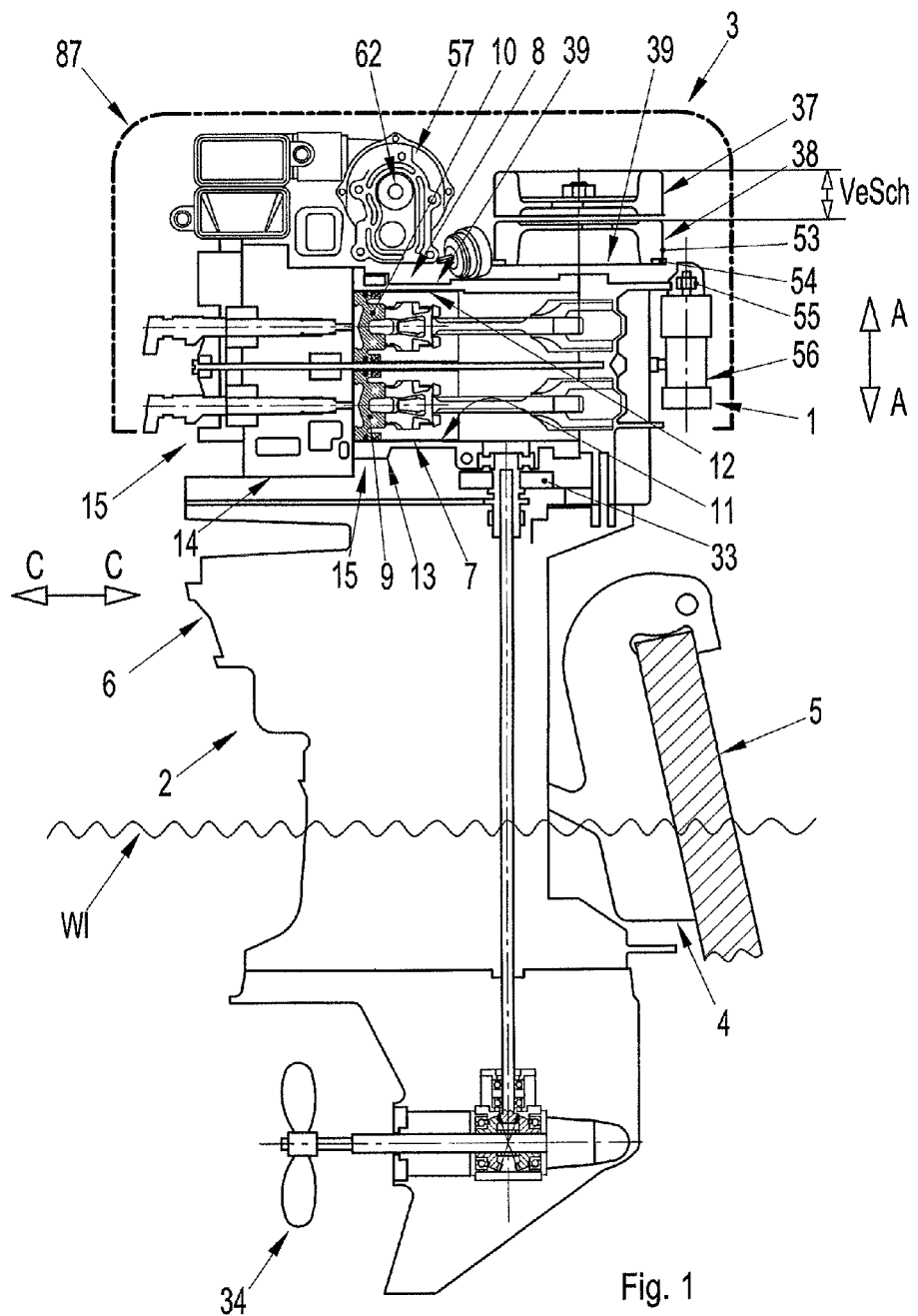
FIG. 1 shows a principle illustration of a reciprocating internal combustion engine which forms an outboard engine, together with a transmission assembly, for the purpose of driving a watercraft.

A reciprocating internal combustion engine 1 is depicted in FIG. 1, which is installed with a transmission device 2 and an outboard engine 3 for the purpose of moving a watercraft which is not illustrated—see CH 168 912 and DE 600 15 262 T2. A holder device 4 serves the purpose of attaching the outboard engine 3 on the watercraft, and engages on both sides of an upright, flange-like rear transverse wall 5 of the watercraft—which is not illustrated in greater detail—and is fastened on a housing 6 of the transmission device 2.

Figure 2:
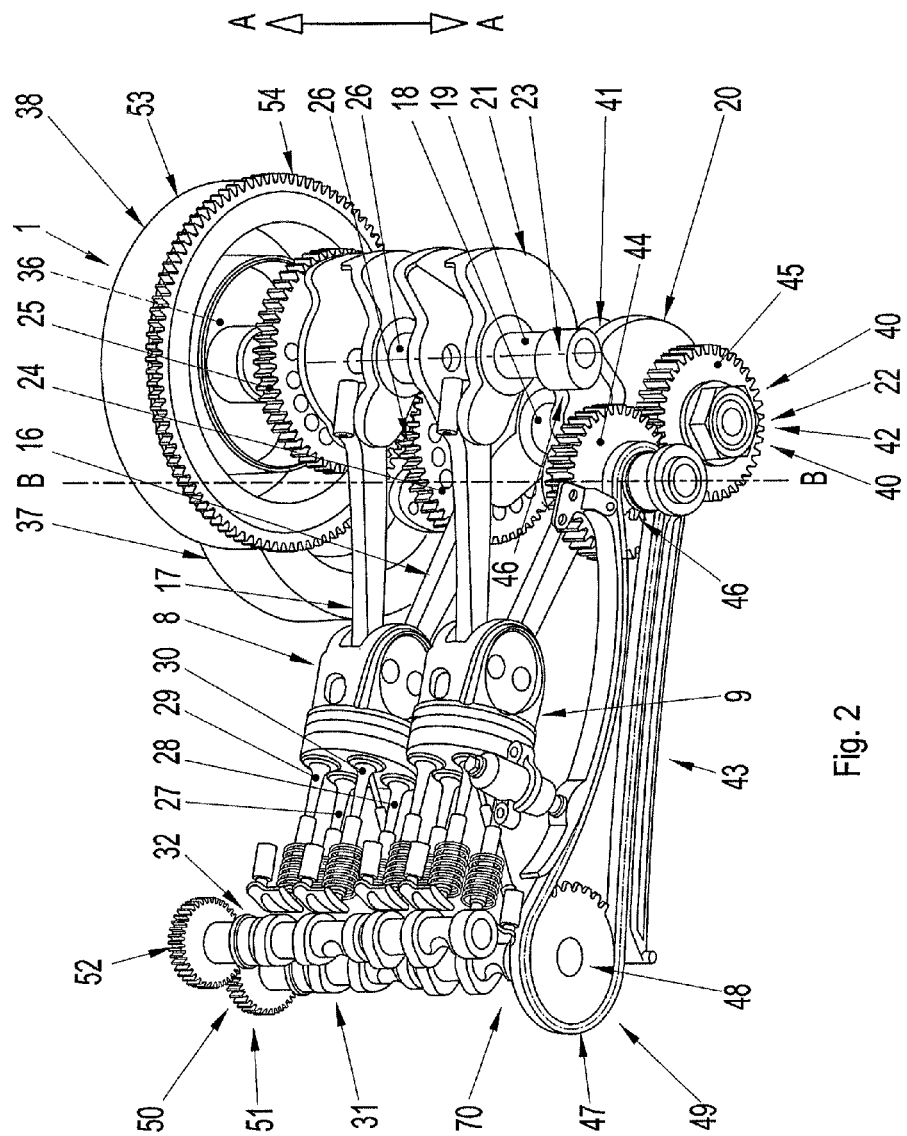
FIG. 2 shows a first perspective view of the reciprocating internal combustion engine, with two connecting rods per piston and two crankshafts.

The reciprocating internal combustion engine 1 has cylinders 7 and 8 arranged in series, with first and second pistons 9 and 10 which are moved back and forth in cylinder bores 11 and 12. The cylinder bores 11 and 12 are created in a cylinder housing 13, which forms an assembly 15 together with a cylinder head 14. A light-metal alloy is used as the material for the cylinder housing 13 and the cylinder head 14. Each piston, by way of example piston 9, works together with a first crankshaft 18 and a second crankshaft 19 via a first connecting rod 16 and a second connecting rod 17 as seen in FIG. 2. Both of the crankshafts 18 and 19, the same configured with counterweights 20 and 21, run parallel to each other with a distance between the same. The crankshafts 18 and 19 rotate about two crankshaft axes 22 and 23, said crankshaft axes 22 and 23 standing upright and/or vertical in the outboard engine 3. The crankshafts 18 and 19 are equipped with first and second synchronization gears 24 and 25. The synchronization gears 24 and 25 have a direct functional connection via a spur gear box 26, in such a manner that the crankshafts 18 and 19 rotate in opposite directions synchronously.

The reciprocating internal combustion engine 1 above operates according to the diesel principle, with direct injection, and its operation is optimized by exhaust gas turbocharging. Two inlet valves 27 and 28 and two outlet valves 29 and 30 per piston 8 are included in the cylinder head 14, the same being connected to the cylinder housing 13, and the gas exchange cycle of the internal combustion engine 1 is controlled by these valves. The inlet valves 27 and 28 are actuated by way of an inlet camshaft 31; the outlet valves 29 and 30 are actuated by way of an outlet camshaft 32.

In the embodiment shown, the first crankshaft 18 acts on a drive screw 34 of the watercraft by way of a transmission 33. And first upper end regions 35 and 36 of the crankshafts 18 and 19 are configured with flywheels 37 and 38, which are located outside of an upper end-face wall 39 of the cylinder head 14 and cylinder housing 13 assembly 15. On lower end regions 40 and 41 which face away from the upper end regions 35 and 36 of the crankshafts 18 and 19, a drive device 42, for a valve drive 43, is attached on the first lower end region 40 of the first crankshaft 18, and the inlet camshaft 31 and the outlet camshaft 32 and/or the inlet valves 27 and 28 and the outlet valves 29 and 30 are actuated by way of the drive device 42.

The flywheels 37 and 38 are arranged with a displacement VeSch between them—see FIG. 1—when viewed in the axial dimension A-A, on the first upper end regions 35 and 36 of the two crankshafts 18 and 19, which enables a sectional overlap of the two flywheels 37 and 38. The displacement VeSch of the flywheels 37 and 38 is relatively small—see FIGS. 1 and 2—in order to establish spatially favorable conditions, as well as for the parallel spacing between the crankshafts 18 and 19.

According to FIG. 2, the flywheels 37 and 38 are adjacent to the synchronization gears 24 and 25, which run in a connection plane which extends perpendicularly to a longitudinal center plane B-B of the internal combustion engine 1. Both crankshafts 18 and 19 are arranged symmetrically to the longitudinal center B-B, which includes an axis of rotation of an idler gear 44. The idler gear 44 is actuated by a drive gear 45 which is fastened on the lower end region 40 of the first crankshaft 18. The idler gear 44 is configured with a coaxial first driving wheel 46 for a continuously variable transmission 47, which works together with a second driving wheel 48. The second driving wheel 48 is connected to the inlet camshaft 31 on a first lower end 49. On a second upper end 50 of the inlet camshaft 31, the inlet camshaft 31 has a first spur gear 51 which engages with a second spur gear 52 of the outlet camshaft 32. The flywheels 37 and 38 are substantially designed with the same construction, although in the embodiment a drive crown 54 is included on an outer periphery 53 of the second flywheel 38 and has a functional connection—see FIGS. 1 and 2—to a sprocket 55 of a starter motor 56, by way of example.

The exhaust gas turbocharger has an exhaust gas turbocharger device 57 with an exhaust gas turbine 58 and a compressor 59 and/or a shaft 62 which carries a turbine wheel 60 and a compressor wheel 61. The shaft 62 is oriented perpendicular to the longitudinal dimension C-C of the watercraft. The exhaust gas turbocharger device 57 is attached on the upper end face 39 of the assembly 15 consisting of the cylinder crankcase 13 and the cylinder head 14, meaning that there is a clear distance to a water line WL—see FIG. 1—where the watercraft meets the water. A first angled tube section 65 is included between an exhaust gas inlet side 63 of the exhaust gas turbine 58 and a first end-face wall section 64 of the cylinder head 14; a second angled tube section 68—see FIG. 3—is included between an exhaust gas outlet side 66 of the exhaust gas turbine 58 and a second end-face wall section 67. Both of the tube sections 65 and 68 are produced from a rigid ferric metal material and are fixed to the cylinder housing 13 and the cylinder head 14 in a rigid connection. However, it can also be contemplated that only the second tube section 68, the same connected to the exhaust gas outlet side 63, is designed as a rigid connection between the exhaust gas turbine 58 and the second end-face section 67, while the first tube section 65 is specifically designed to be elastic.

Figures 6, 7, 8:
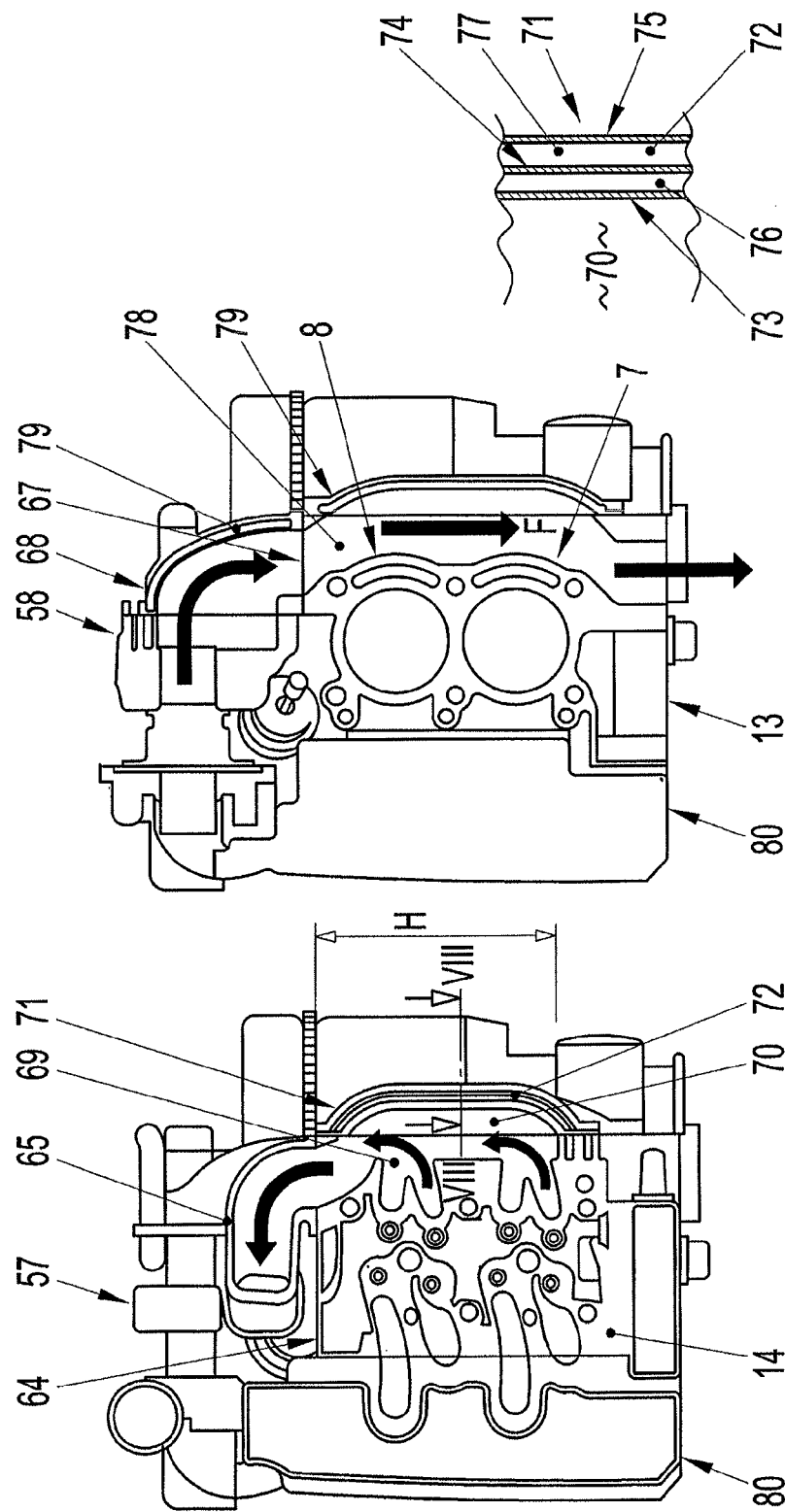
FIG. 6 shows a longitudinal cross-section cut through a first upright exhaust gas channel.
FIG. 7 shows a longitudinal cross-section cut through a second exhaust gas channel.
FIG. 8 shows a cutaway view taken along the line VIII-VIII in FIG. 6, with a larger scale.

The cylinder head 14—see FIGS. 3 and 6—is configured with a first, upright exhaust gas channel 70 on an outlet region 69 of the cylinder head 14, wherein exhaust gases which exit the cylinder head 14 are guided via the exhaust gas channel 70 upward in the direction D, into the exhaust gas turbine 58 of the exhaust gas turbocharger device 57, and from there are applied to the turbine wheel 60. The first exhaust gas channel 64 in the cylinder head 14 is configured with a casing 71 which extends essentially over the height H of the cylinder head—see FIGS. 3 and 6. This casing, for example made of a ferric metal material, for example high-strength thin steel sheet metal 71, is designed as the cooling jacket 72 for the exhaust gases flowing though the exhaust gas channel 70—see FIGS. 6 and 8. The cooling jacket 72, comprising an inner wall 73, a central wall 74, and an outer wall 75, has an inner cooling channel 76 and an outer cooling channel 77, wherein the inner cooling channel 70 has motor oil flowing through it, and the outer cooling channel 71 has cooling water flowing through it. For this purpose, the inner cooling channel 76 is connected to the motor lubricating oil circulation, and the outer cooling channel 77 is connected to the cooling water circulation of the reciprocating internal combustion engine 1.

The exhaust gases which leave the exhaust gas turbine 58 are guided through a second exhaust gas channel 78 in the cylinder housing 13, and particularly downward—in the direction F—past the cylinders 7 and 8 and into an exhaust gas system of the reciprocating internal combustion engine 1. They exit the exhaust gas system in the region of the drive screw 34. The second exhaust gas channel 78 in the cylinder housing 13, which runs approximately in parallel with and at a distance from the first exhaust gas channel 72, is likewise covered by a casing 79, for example made of sheet metal with suitable specifications—see FIG. 7.

The second tube section 68—see FIG. 7—is at least partially configured with a cooling jacket section 79 which has cooling material of the cooling water circulation of the reciprocating internal combustion engine 1 flowing through it. A comparable cooling jacket section 79 is integrated into the exhaust gas turbine 58.

Intake air is supplied to the compressor 59 of the exhaust gas turbocharger device 57 via an upright—when viewed in the vertical direction G-G of the reciprocating internal combustion engine 1—air tank 80. The air tank 80 is closely fit to the assembly 15, and has, by way of example, a square cross-section. An intake air suction muffler (which is not illustrated in greater detail) is integrated into the air tank 80. The medium exiting the compressor 59 arrives in an intercooler 81 through which cooling water of the cooling water circulation flows, and from there arrives in a suction tank 82 of a suction system. The suction tank 82, with an approximately oval or egg-like shape is connected before the cylinder head 14. A first flexible connecting piece 84 is included between the compressor 59 and a housing 83 of the intercooler 81; a second flexible connecting piece 85 is included between the intercooler 81 and the suction tank 82. Both connecting pieces 84 and 85 can be made of a plastically deformable material having a tubular cross-section.

Figure 9:
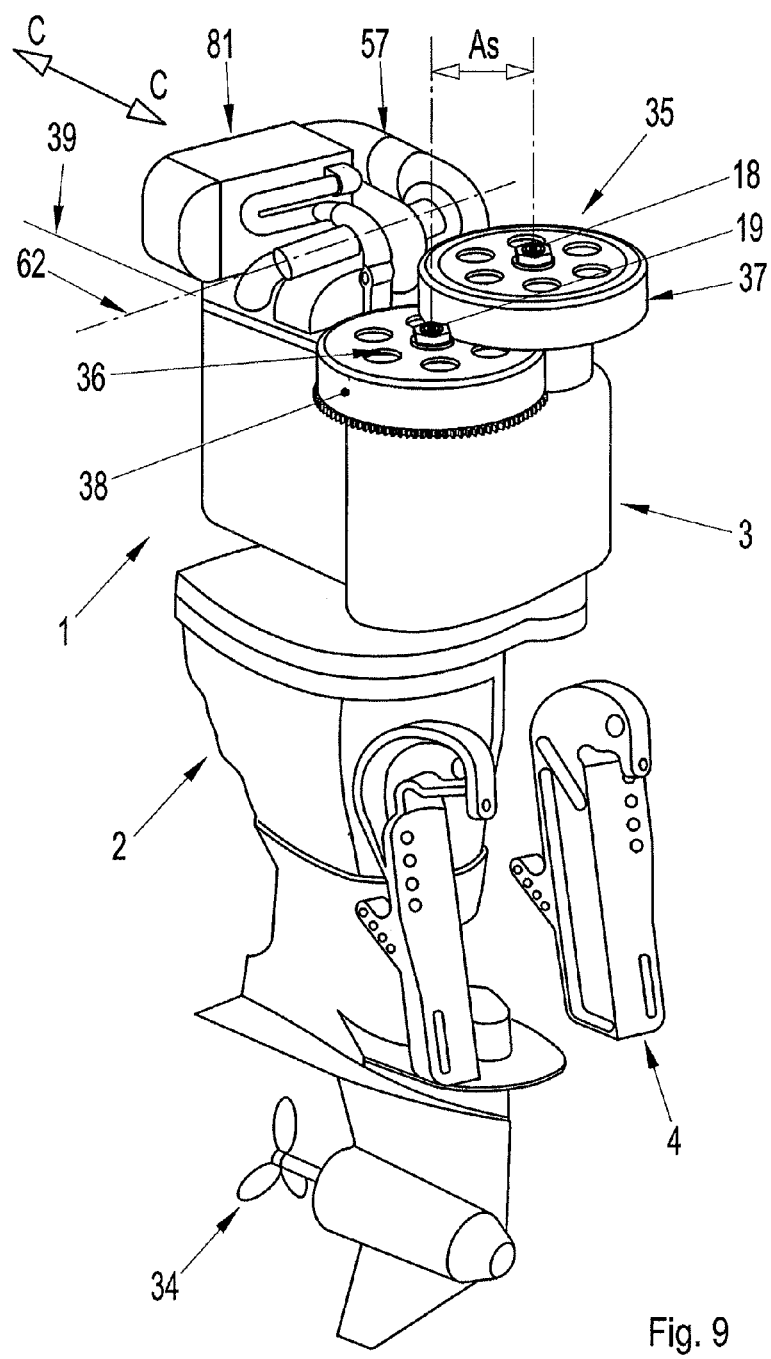
FIG. 9 shows a perspective view from the left rear of the reciprocating internal combustion engine illustrated as an outboard engine, having an assembly consisting of the cylinder head and the cylinder housing, on an upper end face, with flywheels, exhaust gas turbocharger device, and the intercooler.

Finally, on the upper end-face wall 39 of the assembly 15, the flywheels 37 and 38 of the crankshafts 18 and 19, the exhaust gas turbocharger device 57, and the intercooler 81 form a compact component unit 81—see FIG. 9—which is covered by a movable hood 87—see FIG. 1. In this case, the exhaust gas turbocharger device 57 extends between the flywheels 37 and 38 and the intercooler 81.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An outboard motor for a watercraft, comprising:
a cylinder head;
a cylinder housing structurally configured to accommodate therein multiple crankshafts, the cylinder housing having at least one cylinder bore, and forming a subassembly together with the cylinder head;
at least one reciprocating piston that is moved back and forth in the at least one cylinder bore;
first and second crankshafts connected to the at least one reciprocating piston; and
an exhaust gas turbo charging system, wherein
the outboard motor works with the exhaust gas turbocharging system,
the first and second crankshafts stand upright, the first and second crankshafts acting on a drive screw of the watercraft by means of a transmission, the exhaust gas turbocharging system includes an exhaust gas turbocharger device with an exhaust gas turbine and a compressor and/or a shaft carrying a turbine wheel and a compressor wheel, the shaft extends transversely to a longitudinal direction of the watercraft, the exhaust gas turbocharger device is attached to an upper end face wall of the subassembly, the at least one reciprocating piston, which operates based on a diesel principle, interacts by means of an intercalation of two rods with the first and second crankshafts, the first and second crankshafts rotate about two crankshaft axes and are connected to two synchronization gears of a spur gear box, the two synchronization gears being connected to the first and second crankshafts in a rotationally rigid manner in such a way that the first and second crankshafts rotate synchronously in opposite directions, the exhaust gas turbocharging system includes
a first angular tube section that is provided between an exhaust gas inlet side of the exhaust gas turbine and a first upper end face wall section of the cylinder head, and
a second angular tube section that is provided between an exhaust gas outlet side of the exhaust gas turbine and a second upper end face wall section of the cylinder housing, at least one of the first and second angular tube sections forming a dimensionally stable connection between the subassembly and the exhaust gas turbine, the cylinder head has a first, upright, exhaust gas channel on an outlet region, and by way of the first exhaust gas channel exhaust gases are guided upward into the exhaust gas turbine and are applied to the turbine wheel, the first exhaust gas channel is provided with a casing, which extends over a given height of the cylinder head and which is configured as a cooling jacket for the exhaust gases, and the first crankshaft is coupled, at a first end thereof, to a first flywheel and the second crankshaft is coupled, at a first end thereof, to a second flywheel.

2. The outboard motor according to claim 1, wherein the exhaust gases exiting the exhaust gas turbine are guided downward into a second exhaust gas channel in the cylinder housing.

3. The outboard motor according to claim 1, wherein the second angular tube section has a cooling jacket section which is connected to a cooling water circulation circuit.

4. The outboard motor according to claim 1, further comprising a cooling water of a cooling water circulation circuit that flows at least through part of the exhaust gas turbine.

5. The outboard motor according to claim 1, wherein at least one of the first crankshaft and the second crankshaft includes a plurality of counterweights that extend radially outward from a central axis of the at least one of the first crankshaft and the second crankshaft.

6. The outboard motor according to claim 1, wherein one of the first flywheel and the second flywheel overlaps the other of the first flywheel and the second flywheel.

7. The outboard motor according to claim 1, wherein at least one of the first flywheel and the second flywheel includes a region with gear teeth.

8. The outboard motor according to claim 1, wherein one of the first crankshaft and the second crankshaft includes a drive gear coupled to a second end of the first crankshaft and the second crankshaft.

9. The outboard motor according to claim 1, further comprising a coaxial gear set that simultaneously: i) is driven by at least one of the first crankshaft and the second crankshaft, and ii) drives a valve mechanism.

10. The outboard motor according to claim 1, wherein the second crankshaft has journals, two journals of the second crankshaft, to which first and second rods are respectively connected, being separated by a given journal of the second crankshaft to which no rod is connected.

11. The outboard motor according to claim 1, wherein
the cooling jacket has an inner cooling channel and an outer cooling channel,
the inner cooling channel has motor oil flowing through it, and
the outer cooling channel has cooling water flowing through it.

12. The outboard motor according to claim 11, wherein
the inner cooling channel is connected to a motor lubricating oil circulation circuit, and
the outer cooling channel is connected to a cooling water circulation circuit.

13. The outboard motor according to claim 1, further comprising an intake air that is supplied to the compressor via an upright air tank, which is joined to the subassembly.

14. The outboard motor according to claim 13, wherein the air tank is configured with an intake air suction muffler.

15. The outboard motor according to claim 13, further comprising an intercooler and a medium exiting the compressor arrives at the intercooler, and from there is guided into a suction tank of a suction system, said suction tank being connected before the cylinder head.

16. The outboard motor according to claim 1, further comprising an intercooler and a medium exiting the compressor arrives at the intercooler, and from there is guided into a suction tank of a suction system, said suction tank being connected before the cylinder head.

17. The outboard motor according to claim 16, further comprising a first flexible connecting piece that is included between the compressor and the intercooler, and a second flexible connecting piece that is included between the intercooler and the suction tank.

18. The outboard motor according to claim 16, wherein the intercooler is connected to a cooling water circulation circuit.

19. The outboard motor according to claim 16, wherein the exhaust gas turbocharger device and the intercooler are arranged in a compact configuration with respect to each other above the upper end face wall of the subassembly defined by portions of the crankshafts.

* * * * *